United States Patent [19]

Nagasaki

[11] Patent Number: 4,517,409
[45] Date of Patent: May 14, 1985

[54] METHOD FOR CHECKING FUNCTION STATES IN KEY TELEPHONE SYSTEM

[75] Inventor: Yoshio Nagasaki, Yokohama, Japan

[73] Assignee: Kanda Tushin Kogyo, Japan

[21] Appl. No.: 498,048

[22] Filed: May 25, 1983

[30] Foreign Application Priority Data

May 26, 1982 [JP] Japan .................................. 57-89418

[51] Int. Cl.³ .............................................. H04M 1/24
[52] U.S. Cl. .............................. 179/81 C; 179/99 LS; 179/175.11
[58] Field of Search ............ 179/99 LS, 18 EB, 81 C, 179/84 L, 90 L, 99 LC, 99 P, 175.24, 99 R, 175.11

[56] References Cited
U.S. PATENT DOCUMENTS

4,453,040 6/1984 Wolf et al. ...................... 179/99 LS

*Primary Examiner*—Stafford D. Schreyer
*Attorney, Agent, or Firm*—Parkhurst & Oliff

[57] ABSTRACT

In a key telephone system comprising a central control equipment and a plurality of key telephones each comprising a plurality of indication lamps for representing current states of subscriber and extension lines, additional functions such as the assignment of incoming ringing, alarm sound, all call, long distance call and international call can be checked by means of the indication lamps of respective key telephones without actually operating the key telephones. The function data stored in a function data memory in the central control equipment is rearranged in accordance with a transmission format and is transmitted to the key telephones just like as the normal use. The functions preset in the key telephone system can be checked easily and promptly on respective key telephones even by a single operator.

5 Claims, 9 Drawing Figures

FIG_1A

Memory for Telephone 1

|  | j=16 | j=17 | j=18 | | j=22 |
|---|---|---|---|---|---|
| n=1 | ST(1,1,16) | ST(1,1,17) | ST(1,1,18) | | ST(1,1,22) |
| n=2 | ST(1,2,16) | ST(1,2,17) | ST(1,2,18) | | ST(1,2,22) |
| n=N | ST(1,N,16) | ST(1,N,17) | ST(1,N,18) | | ST(1,N,22) |

Memory for Telephone 2

|  | j=16 | j=17 | j=18 | | j=22 |
|---|---|---|---|---|---|
| n=1 | ST(2,1,16) | ST(2,1,17) | ST(2,1,18) | | ST(2,1,22) |
| n=2 | ST(2,2,16) | ST(2,2,17) | ST(2,2,18) | | ST(2,2,22) |
| n=N | ST(2,N,16) | ST(2,N,17) | ST(2,N,18) | | ST(2,N,22) |

Memory for Telephone 16

|  | j=16 | j=17 | j=18 | | j=22 |
|---|---|---|---|---|---|
| n=1 | ST(16,1,16) | ST(16,1,17) | ST(16,1,18) | | ST(16,1,22) |
| n=2 | ST(16,2,16) | ST(16,2,17) | ST(16,2,18) | | ST(16,2,22) |
| n=N | ST(16,N,16) | ST(16,N,17) | ST(16,N,18) | | ST(16,N,22) |

METHOD FOR CHECKING FUNCTION STATES IN KEY TELEPHONE SYSTEM

BACKGROUND OF THE INVENTION

The present invention relates to a method for checking various function states in a key telephone system by using indicators provided in respective key telephones for indicating states of subscriber lines and extension lines.

Nowadays, in a key telephone system composed of a central control equipment and a plurality of key telephones or extension telephones, to each key telephone can be preset various additional functions such as the assignment of incoming ringing, the assignment of alarm sound, the assignment of extension simultaneous ringing, i.e. all call, the assignment of door-phone ringing and so on. As for a method for setting various additional functions mentioned above, there has been proposed two methods, one is to effect the setting operation mechanically by means of short-circuit pins, DIP (Dual Inline Package) switches, etc. arranged in the central control equipment, and the other is to effect the setting operation by storing information for denoting the additional function allocated to respective telephones into a memory device arranged in the central control equipment under the control of a program terminal connected to the central control equipment.

After setting, the states representing the preset additional functions of each key telephone must be checked in a manner mentioned below.

In the example of performing the function setting operation mechanically, it is necessary to check visually positions of the short-circuit pins or the DIP switches in the central control equipment, and then to confirm whether the preset functions are performed correctly or not by actually operating keys of the key telephone according to each additional functions one by one. This checking confirmation requires a very long time and is quite cumbersome, because this operation must be done both on the central control equipment side and the key telephone side. When the number of the functions valid for setting and also the number of the key telephones in the system are large, the above drawbacks become manifest.

Even in case of storing the function setting information in the central control equipment, it is necessary to confirm whether the additional functions have been correctly preset in the central control equipment or not by actually operating the keys according to the functions one by one on the key telephone side, and thus the checking operation requires also a very long time.

SUMMARY OF THE INVENTION

The present invention has for its object to eliminate the drawbacks mentioned above and to provide a novel and useful method for checking preset states of additional functions allocated to each key telephone of a key telephone system in an easy and quick manner.

According to the invention, a method for checking function states preset in a key telephone system comprising a central control equipment and a plurality of key telephones each having indicators for indicating states of subscriber and/or extension lines in a normal use, comprises the steps of:

setting the central control equipment into a function check mode;

reading function data out of a function data memory provided in the central control equipment;

transmitting the function data thus read out to a key telephone;

driving the indicators of the relevant key telephone in accordance with the transmitted function data; and checking whether or not predetermined functions have been correctly preset by monitoring the lighting conditions of the indicators.

DESCRIPTION OF THE PREFERRED EMBODIMENTS

Figure 1A:
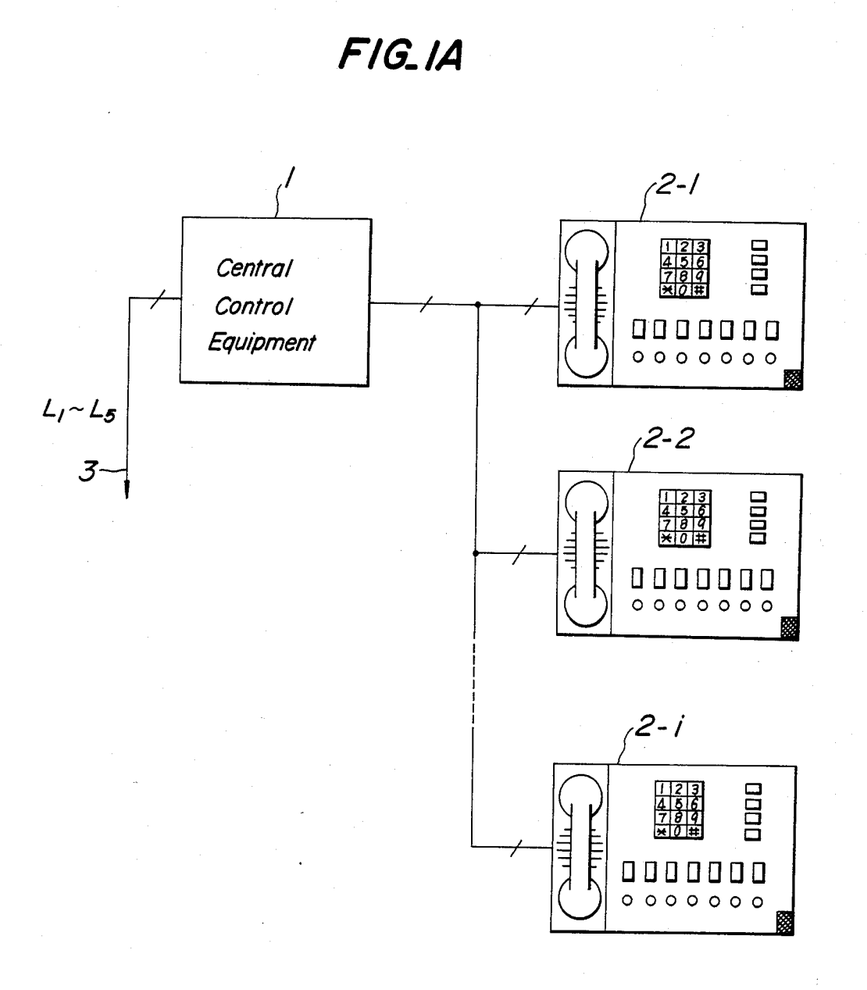
FIG. 1A is a schematic view showing one embodiment of a key telephone system composed of a central control equipment and a plurality of key telephones and FIG. 1B is a plan view showing the key telephone.
Figure 1B:
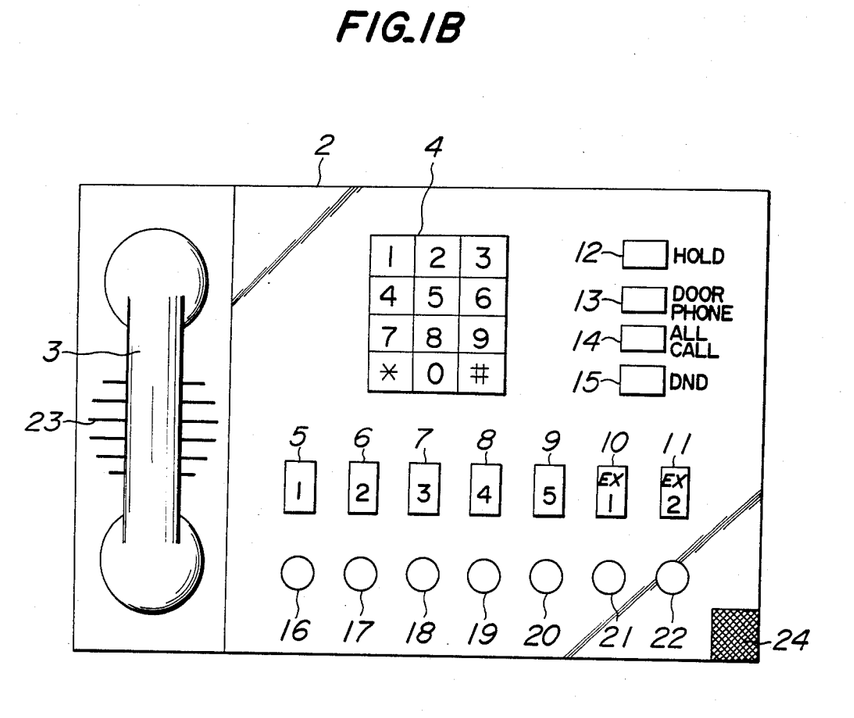

FIG. 1A is a schematic view showing one embodiment of a key telephone system to which the checking method according to the invention can be advantageously applied. The key telephone system comprises a central control equipment 1 and a plurality of key telephones 2-1, 2-2 . . . 2-i. In this embodiment, there are provided five subscriber lines i.e. central office lines $L_1$ to $L_5$ and two extension lines. As shown in FIG. 1B, each key telephone set 2 comprises a handset 3, ten key type dial buttons 4, five subscriber line buttons 5, 6, 7, 8 and 9, two extension line buttons 10 and 11, a hold button 12, a door-phone button 13, a simultaneous calling button 14 and a "Do Not Disturb" button 15 for inhibiting an incoming sound. The key telephone 2 is further provided with five subscriber line indication lamps 16, 17, 18, 19 and 20, two extension line indication lamps 21 and 22, a loudspeaker 23 and a microphone 24. The lamps 16 to 22 are controlled by the central control equipment 1 in the known manner. If it is assumed that the first, second and fourth subscriber lines $L_1$, $L_2$ and $L_4$ are not in the busy state, the third line $L_3$ is in the busy state and the fifth line $L_5$ is in the calling state, the lamps 16, 17 and 19 are lighted off, the lamp 18 is lighted on and the lamp 20 is flashed under the control of the central control equipment 1. When the first extension line is in use, but the second extension line is not in use, the lamp 21 is lighted on, but the lamp 22 is lighted off. When the hold button 12 is pushed after any one of the subscriber line buttons 5 to 9 has been pushed, the relevant subscriber line is held in the busy state for a short time such as two minutes. Thus, the connection is restored by pressing the relevant subscriber line button.

When the door-phone button 13 is pushed, the person can talk with a calling person standing in front of an external device of a door-phone set. When the all call button 14 is pushed, the person can call all the key telephones simultaneously. When the "Do Not Disturb" button 15 is pushed, no incoming sound (e.g. ringing) is generated, although the related line lamp is flashed. Besides the above functions, the key telephones can be preset to have many other functions. For instance, the incoming sound can be generated in any desired one or more key telephones. For instance, the incoming sound for all subscriber lines may be generated at only one preselected key telephone, while the other key telephones do not receive the incoming sound. Moreover, background music may be selectively produced for one or more predetermined key telephones. The background music can be reproduced by operating suitable buttons, such as hold buttons of respective key telephones. Further, the assignments to prohibit long distance calls, prohibit international calls and allow intercommunication use only may be selectively allocated to any desired one or more key telephones.

Figure 2:
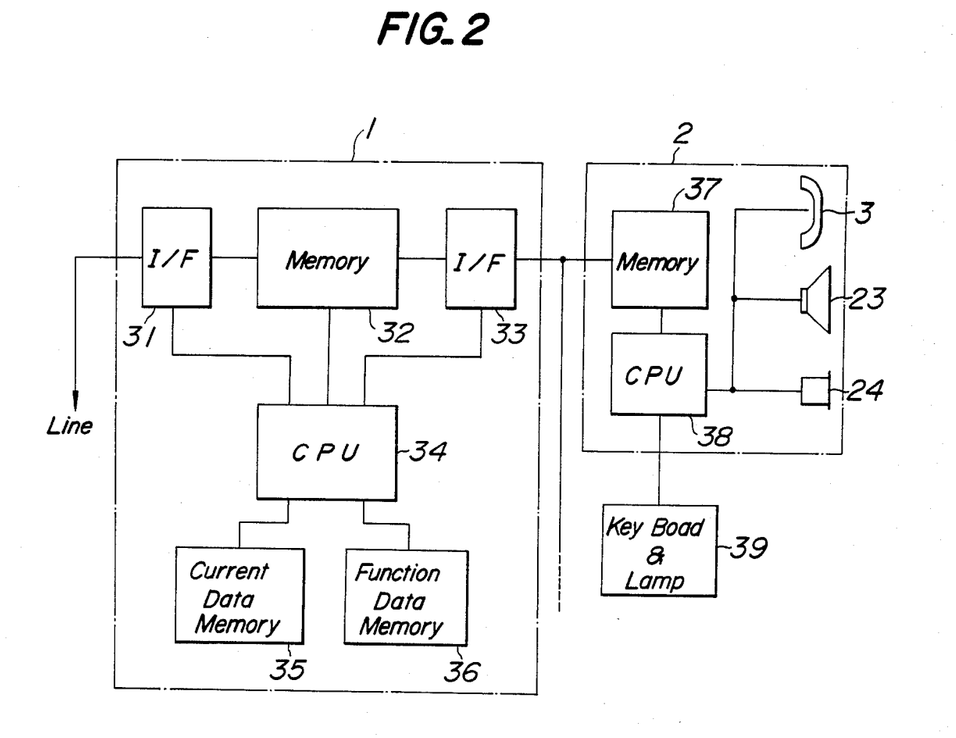
FIG. 2 is a block diagram illustrating a detailed construction of the central control equipment and key telephone according to the invention.

FIG. 2 is a block diagram showing detailed constructions of the central control equipment 1 and the key telephone 2. In the normal condition, scanned data derived from all the subscriber and extension lines and all the key telephones are stored temporarily in a memory 32 through interfaces 31 and 33, and then stored in a current data memory 35 as current data representing a current state under the control of a central processing unit (CPU) 34. Moreover, the CPU 34 functions to supply the current data to the subscriber and extension lines and a plurality of the key telephones through the interfaces 31 and 33. In this manner, respective key telephones 2 are always controlled by the central control equipment 1. In the key telephone 2, the supplied data is stored temporarily in a memory 37, and the indication lamps 16 to 22 are controlled according to the stored data under the control of a central processing unit (CPU) 38. Each key telephone is repeatedly scanned with a short period such as 65 ms.

Figure 3:
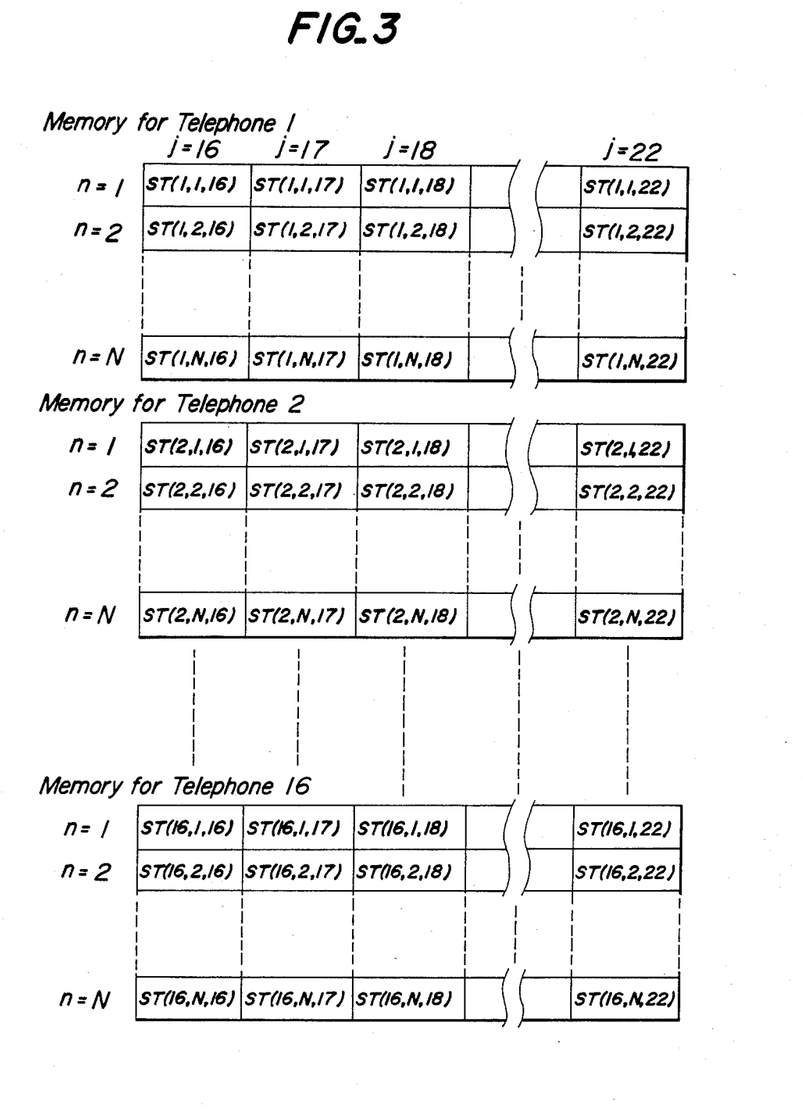
FIG. 3 is a schematic view depicting a function data structure stored in a function data memory according to the invention.

The basic and additional functions for respective key telephones can be preset by means of a function data memory 36 comprising a matrix for the short-circuit pins or the DIP switches. FIG. 3 is a schematic view showing a function data format stored in the function data memory 36. As shown in FIG. 3, use is made of three dimentional array ST(i,n,j), where i is the number of the key telephones (in this embodiment, sixteen sets), n is the function group number and j is the lamp number.

When effecting the checking operation for a key telephone by utilizing the function data memory 36, at first the function group n of the relevant key telephone is selected and then the data included in the thus selected function group n is read out of the function data memory 36 and is temporarily stored in the memory 32. Then the function data is supplied to the relevant key telephone. In the key telephone, the function data is stored in the memory 37 and the indication lamps 16 to 22 are lighted on or off in accordance with the function data stored in the memory 37. Therefore, the operator can check the states of the various additional functions on the key telephone side. Hereinafter, examples of the function groups n=1 and n=2 are shown in tables 1A and 1B.

TABLE 1A

| | (n = 1) | |
|---|---|---|
| Lamp number | Normal indication | Checking indication (additional function) |
| 16 | line $L_1$ | assignment of incoming ringing on line $L_1$ |
| 17 | line $L_2$ | assignment of incoming ringing on line $L_2$ |
| 18 | line $L_3$ | assignment of incoming ringing on line $L_3$ |
| 19 | line $L_4$ | assignment of incoming ringing on line $L_4$ |
| 20 | line $L_5$ | assignment of incoming ringing on line $L_5$ |
| 21 | extension $Ex_1$ | no use |
| 22 | extension $Ex_2$ | no use |

TABLE 1B

| | (n = 2) | |
|---|---|---|
| Lamp number | Normal indication | Checking indication (additional function) |
| 16 | line $L_1$ | assignment of do not disturb (DND) |
| 17 | line $L_2$ | assignment of alarm sound |
| 18 | line $L_3$ | assignment of all call |
| 19 | line $L_4$ | assignment of door-phone ringing |
| 20 | line $L_5$ | assignment of background music sound |
| 21 | extension $Ex_1$ | assignment of long distance call |
| 22 | extension $Ex_2$ | assignment of international call |

If a key telephone is allowed to generate the incoming sound for all the five subscriber lines $L_1$ to $L_5$, the lamps 16 to 20 are lighted on. Of course, the lamps 21 and 22 are lighted off. However, if the relevant key telephone is allowed to produce the incoming sound only for the first subscriber lines $L_1$, only the lamp 16 is lighted on, but the remaining lamps 17 to 22 are all lighted off.

When the function group n=2 is selected, and the setting state of the additional functions in the relevant key telephone 2-1 are as follows: DND—ON; alarm sound—OFF; all call—ON; door-phone—OFF; background music sound—ON; long distance call—ON; international call—ON, the lamp 16 is lighted on, the lamp 17 is lighted off, the lamp 18 is lighted on, the lamp 19 is lighted off, the lamp 20 is lighted on, the lamp 21 is lighted on and the extension lamp 22 is lighted on. In this manner, it is possible to confirm the preset states of the additional functions easily and speedily on the key telephone side by checking the lighting condition of the indication lamps without actually operating the key telephone.

Figure 4:
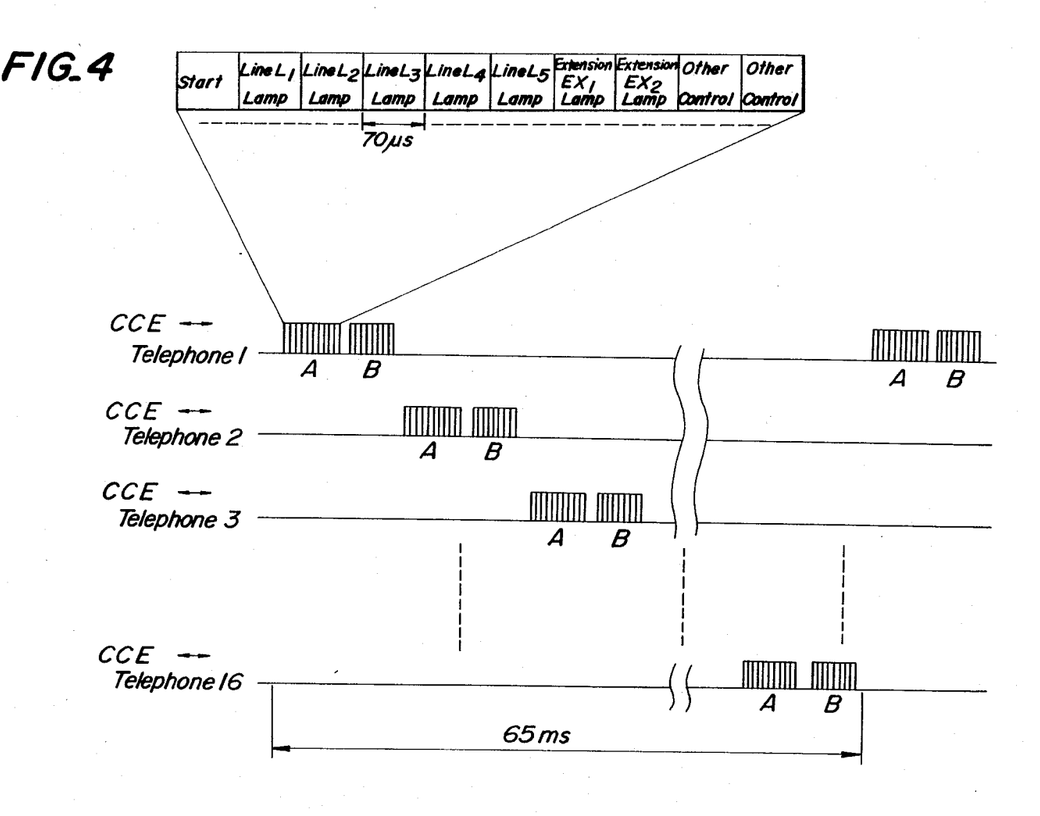
FIG. 4 is a schematic view showing one embodiment of a data transfer format according to the invention.

FIG. 4 is a schematic view showing one embodiment of a format of data transmission between the central control equipment (CCE) 1 and the respective key telephones. As shown in FIG. 4, a transfer of a minimum data element takes 70 μs and also one period of the data transmission i.e. one scanning period is 65 ms. In this embodiment, A shows a data transmission from the CCE 1 to the key telephone 2 and B illustrates a data transmission from the key telephone 2 to the CCE 1.

Figure 5:
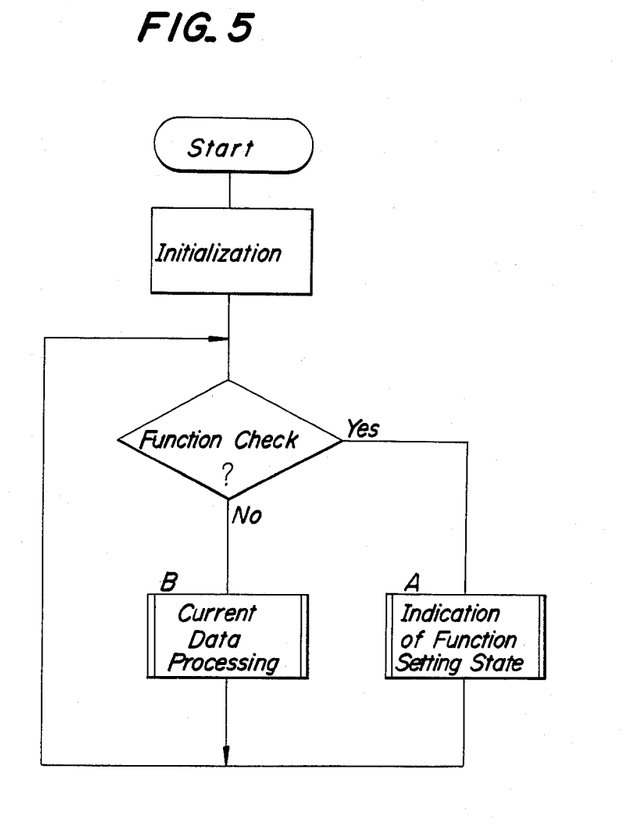
FIG. 5 is a flow chart illustrating a main routine of the key telephone system according to the invention.

Hereinafter, the operation of the key telephone system will be explained with reference to flow charts. FIG. 5 is a flow chart showing a main routine of the key telephone system according to the invention. At first, the circuits and memories are initialized, and then it is detected whether the function check requirement is produced or not. Such a requirement may be supplied from the key telephone 2 to the CCE 1 or may be directly supplied to the CCE 1. When such requirement is supplied from the key telephone, a subroutine A is effected and the additional function preset states can be checked. On the other hand, if such requirement is not supplied, a subroutine B is performed for effecting the normal operation of the key telephone system.

Figure 6:
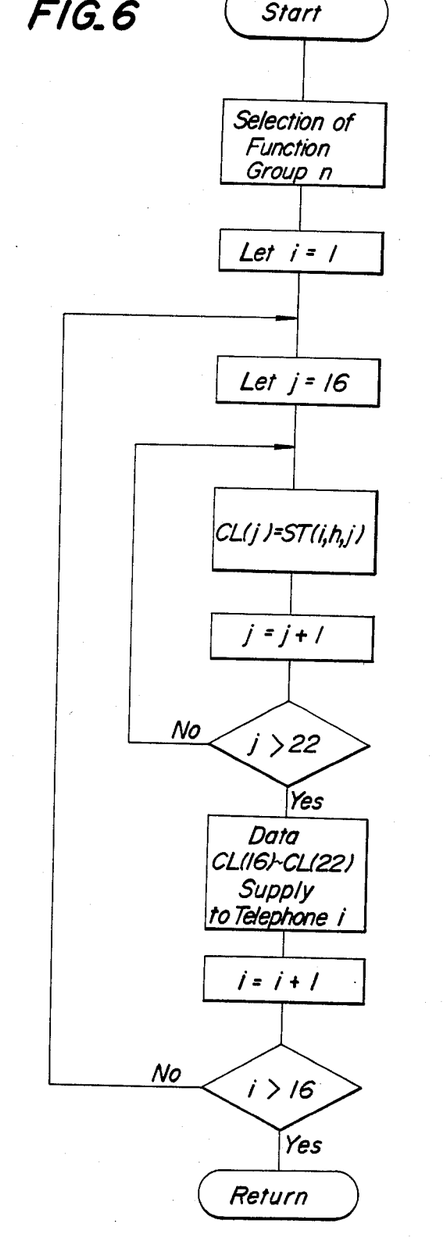
FIG. 6 is a flow chart depicting a subroutine A for checking a function setting state shown in FIG. 5.

FIG. 6 is a flow chart illustrating the detailed contents of the subroutine A for checking whether or not the additional functions have been preset correctly for the key telephones. In this subroutine A, at first, the function group n is selected. This selection may be effected by the operator by actuating suitable buttons of a key telephone. Now it is assumed that the function group n=1 is selected first. Then the first key telephone number i=1 is automatically selected and the function data ST(1,1,16) to ST(1,1,22) are successively read out of the function data memory 36 and are temporarily stored in the memory 32 as the transmission function data CL(16) to CL(22). Then, the function data CL(16) to CL(22) are transmitted to the key telephone 2-1 by the format shown in FIG. 4. Next, the second key telephone 2-2 (i=2) is selected and the function data ST(2,1,16) to ST(2,1,22) are read out successively and are stored in the memory 32 as the transmission function data CL(16) to CL(22) which are then transmitted to the second key telephone 2-2. After these operations have been repeated sixteen times (in this embodiment, the telephone number is assumed sixteen), the subroutine loop A for the function group n=1 is ended. Next, the subroutine A for the group number 2 will be started. This subroutine loop A is repeated until a function check cancelling requirement is supplied from the key telephone to the central control equipment 1.

Figure 7:
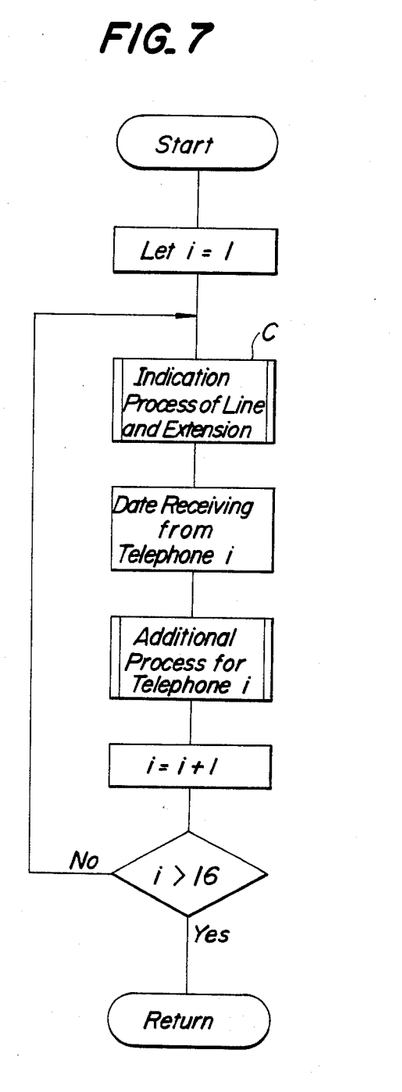
FIG. 7 is a flow chart showing a subroutine B for controlling the key telephone system in a normal use according to the invention.

FIG. 7 is a flow chart showing the subroutine B for controlling the key telephone system in the normal use shown in FIG. 5. In this subroutine B, the telephone number i is selected and a subroutine C is performed so as to indicate the states of the subscriber and extension lines on the telephone i. Then, a reply from the telephone i is received in the central control equipment, and according to the received reply a subroutine for effecting an additional process for the telephone i is carried out. Such additional process includes, for instance, a connection between the line and the telephone i and a paging from the telephone i. In this manner, one sequential operation for the telephone i is ended, and then this sequence is repeated sixteen times so as to control all the key telephones.

Figure 8:
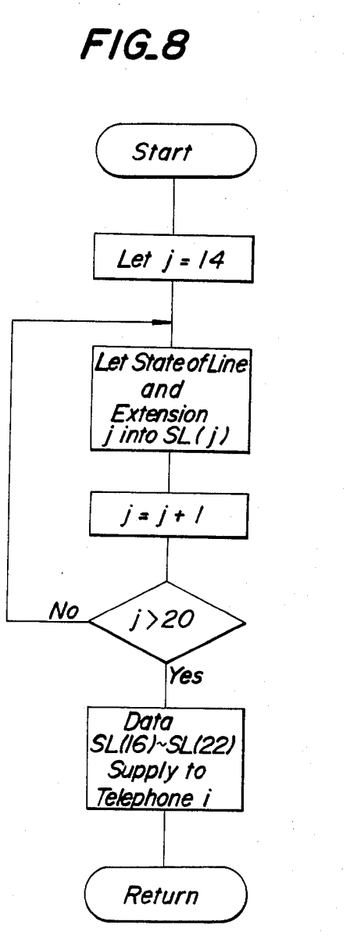
FIG. 8 is a flow chart illustrating a subroutine C for indicating states of subscriber and extension lines shown in FIG. 7.

FIG. 8 is a flow chart showing the subroutine C for indicating the states of subscriber and extension lines shown in FIG. 7. In this subroutine C, the states SL(j) of subscriber and extension lines representing, for example, the busy, waiting and calling states are transferred from the current data memory 35 to the memory 32, and then are supplied to the telephone i so as to indicate the states of subscriber and extension lines by means of the corresponding lamps 16 to 22.

The present invention is not limited to the embodiments mentioned above, but various alternations and modifications are possible. For example, the lamps 16 to 22 may be formed by light emitting diodes, liquid crystal displays, electroluminescence displays and so on other than the normal incandescent lamp used in the embodiment. Moreover, in the above embodiment, the system check requirement is produced by operating the ten key dials of the key telephone and is supplied from the key telephone to the central control equipment, but it is possible to arrange a changeover switch between the CPU 34 and the data memories 35, 36, and to drive manually the changeover switch to the function data memory 36 side when such function check requirement is supplied. If the key telephone is not provided with the extension line indication lamps, the function check may be effected by using only the subscriber line indication lamps.

As mentioned above, according to the invention, since the setting stages of the various functions can be checked by indicating them on the lamps of the corresponding key telephone, it is possible to detect the preset function states of each key telephone in an easy and quick manner. Moreover, since the function check requirement can be generated from the key telephone side, it is possible to effect the checking operation by only one operator, and thus to eliminate a time consuming and cumbersome operation in case of setting the key telephone system. Further, since the preset function array (ST(i,n,j) entered in the function data memory by means of the short-circuit pins or the DIP switches can be extended easily, it is possible to increase the function setting number in an easy and swift manner. Since the central processing equipment effects the indication of the preset functions on each key telephone by processing command signals which will be generated upon performing actually the preset functions, it is also possible to detect the operational condition of the whole hardware of the system.

What is claimed is:

1. A method for checking function states preset in a key telephone system comprising a central control equipment and a plurality of key telephones each having indicators for indicating states of subscribers and/or extension lines in a normal use, comprising the steps of:
setting the central control equipment into a function check mode;
reading function data out of a function data memory provided in the central control equipment;
transmitting the function data thus read out to a key telephone;
driving the indicators of the relevant key telephone in accordance with the transmitted function data to produce indicator conditions which represent the transmitted function data; and
checking whether or not predetermined functions have been correctly preset by monitoring the conditions of the indicators.

2. A method according to claim 1, wherein said step for setting the central control equipment into the function check mode comprises:
checking whether a function check requirement is generated or not; and
driving the central control equipment into the function check mode when the function check requirement is detected.

3. A method according to claim 2, wherein said function check requirement is generated from said key telephone by operating one or more buttons provided in said key telephone.

4. A method according to claim 2, wherein said function check requirement is generated in said central control equipment by actuating a switch provided therein.

5. A method according to claim 1, wherein said transmission of the function data is effected under the same transmission format as that for transmitting current data for the indicators in the normal use.

* * * * *